April 16, 1968   F. J. DU BOIS   3,378,387
METHOD OF PREPARING SLURRIES OF SILICEOUS PIGMENT
Filed Aug. 14, 1964   2 Sheets-Sheet 1
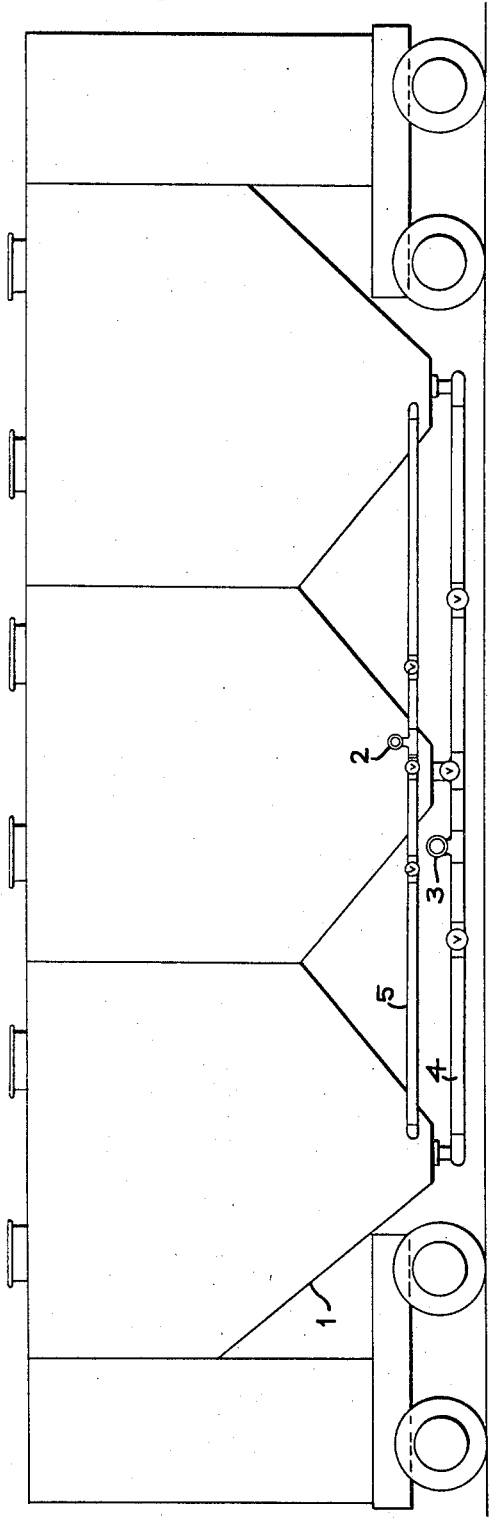
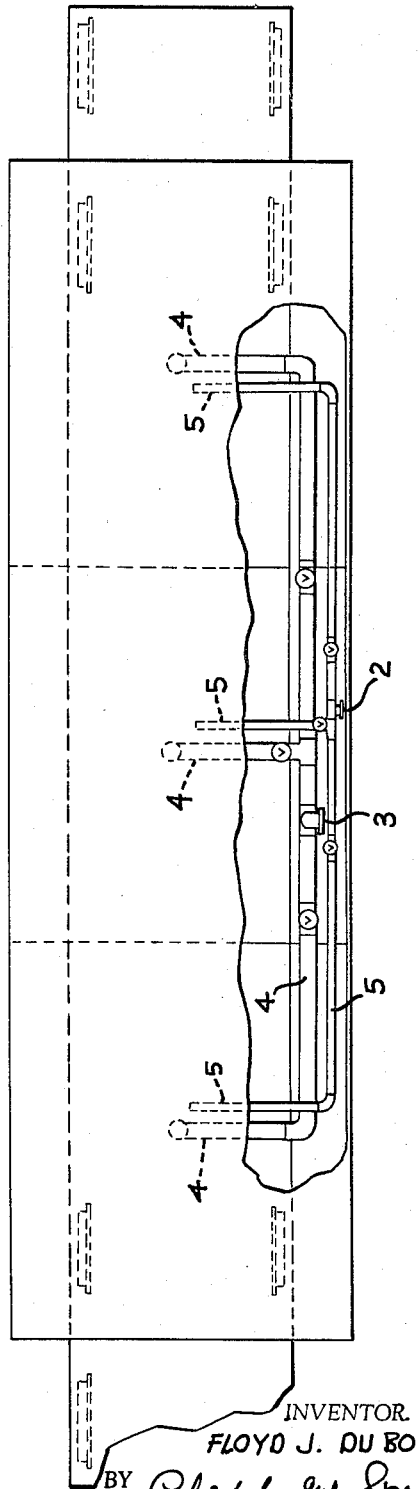
INVENTOR.
FLOYD J. DU BOIS
BY Chisholm and Spencer
ATTORNEYS

INVENTOR.
FLOYD J. DU BOIS

United States Patent Office

3,378,387
Patented Apr. 16, 1968

3,378,387
METHOD OF PREPARING SLURRIES OF SILICEOUS PIGMENT
Floyd J. DuBois, Pittsburgh, Pa., assignor to Pittsburgh Plate Glass Company, Pittsburgh, Pa., a corporation of Pennsylvania
Filed Aug. 14, 1964, Ser. No. 389,661
11 Claims. (Cl. 106—309)

ABSTRACT OF THE DISCLOSURE

Dry siliceous pigments are prepared for use in a wet process stream by making an aqueous slurry of a siliceous pigment in a vessel into which water is supplied at the bottom of the vessel at a rate of flow such that the water rises upwardly throughout the pigment mass without appreciably displacing the mass in an upward direction.

---

Figure 2:
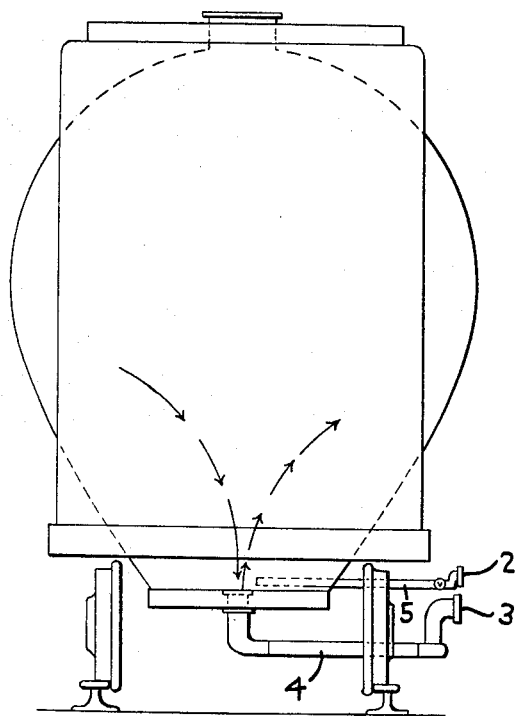

This invention relates to handling in bulk form pigment materials. More specifically, this invention relates to dispersing a mass of pigment materials comprising siliceous pigment into a slurry. Still more particularly, the invention relates to establishing and maintaining a stable flowable slurry comprising siliceous pigment in aqueous media.

Siliceous pigments are utilized extensively in, for example, the paper, plastics, and rubber industries. Often other materials such as titanium dioxide pigment and/or clay fillers are employed with these siliceous pigments.

Charging dry materials into a process often involves costly handling operations. Frequently, considerable amounts of material are lost as dust when handled in this fashion. Handling pigments in slurry form introduces flexibility to a process. When siliceous pigments are charged to a process in 50 pound bags, for example, as has typically been the practice, additions of other than 50 pound units are inconvenient. Charging pigments in slurry form makes it convenient to effect minor adjustments to a process. Other advantages of handling pigments in slurry are convenience of storage, reduced manpower requirement, and better adaptability to automatic control or automation.

Slurries capable of being introduced to a wet process stream are often readily prepared by adding the dry pigment to the liquid phase. In operation, however, this procedure requires about as much handling of dry pigment as when the pigment is charged in dry form directly to the process.

Attempts to prepare a slurry by merely adding water to a mass of finely divided pigment material have usually been unsatisfactory, due, for example, to the presence of lumps of undispersed pigment. Unacceptably high amounts of energy are typically required to agitate such a mixture sufficiently to satisfactorily disperse the pigment into the liquid phase. Thus, preparing slurries by adding water to finely divided dry pigment has generally been a commercially unattractive technique.

According to this invention, there is provided a method whereby a confined mass of finely-divided dry siliceous pigment material is readily dispersed into a slurry with commercially acceptable properties by adding the liquid (usually water) directly to the dry solids. The resulting slurry is stable, i.e., easily maintained in suspension.

By "dry pigment" is meant pigment which is dry to the touch. Dry pigment typically contains varying amounts of both "free" and "bound water." By "free water" is meant that water which is removed from the pigment by heating it at 105° C. to constant weight. "Bound water" is that water which is removed from the pigment by heating it at ignition temperature for an extended period, e.g., 24 hours, less "free water." Dry pigment typically contains from about 2 to about 10 percent by weight of the composition of each "free" and "bound water."

According to a preferred embodiment of this invention, a mass of dry, powdery pigment confined in, for example, a storage bin or railroad car, e.g., a tank car or a hopper car is dispersed in situ into a flowable slurry. Thus, water or other suitable aqueous media is introduced to the lower portion of the mass and allowed to rise up through the mass thereby wetting the pigment materials. Preferably, sufficient water is introduced to form a slurry of predetermined solids content before agitation is commenced. Agitation can often commence earlier; however, additional energy is normally required due to the higher solids content of the slurry prior to all of the water's being added. Preferably, care is taken to introduce water at a rate which allows wetting of the pigment material in place. If water is added too rapidly, the pigment or a portion thereof tends to float on top of the water.

Although this invention is applicable to any pigment which is capable of dispersion in accordance with the technique herein disclosed, it has been found to be of particular benefit in dispersing pigment mixtures containing finely-divided amorphous siliceous pigments of the type disclosed, for example, in U.S. Patents 3,034,913 and 3,034,914, the disclosures of which are hereby incorporated by reference.

U.S. Patents 3,034,913 and 3,034,914 teach the preparation of finely-divided siliceous pigments, particularly noted for their paper pigmenting properties. These pigments are prepared by precipitating silica from an aqueous medium having a composition corresponding to that provided by mixing an acid, such as hydrochloric acid with sodium silicate or like alkali metal silicate. Characteristic of many of these precipitated products are their considerable degree of uniformity in both ultimate particle size and floc size. Chemically, they are primarily $SiO_2$ and usually one or more metal oxide, notably an alkaline earth metal oxide, e.g., calcium oxide. As an example, the calcium oxide-silicon dioxide products can be represented on an anhydrous basis by the formula: $CaO(SiO_2)_x$, where $x$ ranges from 5 to 25 or higher including fractional values. The average ultimate particle diameter of these products, as measured by the electron microscope, is typically less than 1 micron, normally from about 0.005 to about 0.5 micron. The $SiO_2$ content on an anhydrous basis is at least 50, typically more than about 75 percent by weight. BET surface area of these pigments ranges from about 26 to about 100 square meters per gram. By BET surface area is meant the surface area calculated by the recognized method of Brunauer, Emmett and Teller which is described in the Journal of the American Chemical Society, vol. 60, pp. 309 (1938).

The pigments prepared by reacting solutions of an aluminum salt such as aluminum sulfate, aluminum chloride, aluminum nitrate or ammonium alum and alkali metal silicate, notably sodium silicate in accordance with U.S. Patents 2,739,073 and 2,848,346, for example, are also readily dispersed and handled by the process of this invention. These products are composed essentially of alkali metal, aluminum and silica oxides with average ultimate particle diameters usually below 1 micron, typically below 0.5 micron. BET surface areas of these products normally range from about 45 to about 230 square meters per gram.

Other siliceous pigments which may be dispersed, although less readily than those hereinbefore described, in accordance with the teachings of this invention are those described in and/or prepared in accordance with the disclosures of U.S. Patents 2,805,955, 2,940,830, 2,943,411, or British Patent 756,857.

The drawings illustrate a preferred embodiment of the invention. FIGURES 1 and 2 illustrate diagrammatically the side and end views, respectively of a water-tight railroad hopper car. FIGURE 3 illustrates the disposition of the sparger system with respect to the plan outline of the car.

A predetermined quantity of siliceous pigment alone or in admixture with other pigments is shipped to its intended destination in hopper 1 of the car. Air and water lines are connected to intakes 2 and 3 respectively of the car's sparger system. A measured amount, sufficient to produce a slurry of the desired solids content, of water is pumped through the water manifold 4 to hopper 1. After the addition of the water, air is introduced under pressure through the air manifold 5 to the hopper 1. The air bubbles up through the water thereby dispersing the pigment therein. The resulting slurry is then pumped or allowed to flow by gravity from the hopper car through manifold 4.

The slurry is usually directed from the car to a storage area. It is often convenient, however, to feed the slurry directly from the hopper car to a process stream.

The solids content preferred to be established and maintained in the slurry depends on the specific pigment composition being dispersed. Too low a solids content results in rapid settling of the solids from the slurry. Too high a solids content results in unacceptable flow properties. A slurry with solids content consisting essentially of 1.5 pounds or more per gallon of the siliceous pigment produced in accordance with U.S. Patent 3,034,914, for example, forms a loose gel upon standing. Only moderate agitation is required to break the gel and redisperse the solids. Slurries containing up to 2.25 pounds per gallon of this pigment have acceptable flow properties. Solids usually settle at unacceptably high rates from slurries of this material containing less than about 1.0 pounds of solids per gallon. Thus, the most desirable solids concentration range for storing and handling slurries of this particular material is between about 1.0 and about 2.25 pounds (anhydrous basis) per gallon of slurry.

It has been observed that slurries of siliceous pigments which include one or more metal oxides, particularly oxides of multivalent metals, e.g., CaO often increase markedly in viscosity upon aging. By "aging" is meant the passing of time after preparation of the slurry.

Although slurry viscosities in excess of 6,000 centipoises as measured by the Brookfield viscometer at 20 r.p.m. have been found tolerable in the practice of this invention, lower viscosities are preferable. Copending application Ser. No. 358,365 filed Apr. 8, 1964, commonly assigned with the instant application, describes a method whereby the viscosities of such slurries are maintained at a low level. According to the teachings of said application Ser. No. 358,365, the disclosure of which is hereby incorporated by reference to the extent that it is applicable hereto, the solids concentration which can be maintained suspended in an aged slurry is increased by providing in the slurry ions capable of removing metal ions of the metal oxide from the aqueous phase of the slurry. Thus, by including with the solid pigment or the aqueous dispersant less than 10, typically about 1 to about 3 percent by weight, basis the oven dry weight of the solids, water soluble carbonate, sulfate, sulfite, hydrogen carbonate, hydrogen sulfate, or hydrogen sulphite, for example, it is possible to disperse into slurry in accordance with this invention up to about 4 pounds per gallon of the aforedescribed siliceous pigment. As an alternative to introducing the aforedescribed non-gaseous electrolytes to the slurry, carbon dioxide gas is conveniently bubbled through the slurry, often as an agitating gas, to maintain low viscosity of the slurry.

As used herein and in the accompanying claims, the "pounds per gallon" of a pigment slurry is determined as follows:

(1) A sample of slurry is dried in an oven at 105° C. to constant weight. The percent solids is considered to equal:

$$\frac{\text{Weight of oven dry pigment}}{\text{Weight of slurry}} \times 100$$

(2) The specific gravity of the slurry is determined by weighing equal volumes of slurry and water and dividing the weight of the slurry by the weight of the water.

(3) Pounds per gallon are considered equal to:

$$\frac{\text{Percent solids} \times \text{specific gravity}}{12}$$

EXAMPLE I

A standard railroad hopper car with three separate compartments of approximately equal volume was loaded with a siliceous pigment material of the following approximate composition and characteristics:

| | Percent |
|---|---|
| $SiO_2$ | 80 |
| $CaO$ | 5 |
| Free water | 6 |
| $NaCl$ | 1 |
| $Al_2O_3$ | 1 |
| $Fe_2O_3$ | 0.2 | pH, 9.5.
Surface area (BET), 40 sq. meters per gram.
Average particle size, 0.08 micron.

The lower portion of two sides of each compartment sloped to form a trough at the bottom thereof. Each compartment had two bottom outlets. Each outlet of each compartment was manifolded with a 4-inch diameter line. A 4-inch diameter water line and a 1-inch diameter air line communicated with the manifold. Valves were arranged on the manifold and the water and air lines to allow introduction of air or water into each compartment as required.

Water was introduced to the first compartment at a rate of approximately 150 gallons per minute, to the second compartment at a rate of 200 gallons per minute, and the third compartment at a rate of 300 gallons per minute. A water meter was provided in the water line. The water was shut off when a predetermined number of gallons had flowed into a hopper compartment. The water level in the first two compartments raised slowly up through the pigment material while the pigment remained in place. In the third compartment, the pigment bed tended to float on the rising water. Each hopper compartment had a volume of approximately 1000 cubic feet and held approximately 12,000 pounds of pigment (anhydrous basis). 5265 gallons of water were introduced into each compartment to form a slurry containing approximately two pounds of pigment (anhydrous basis) per gallon of slurry.

Air was introduced to each of the hoppers at 35 to 40 p.s.i.g. for a period of about 15 minutes in the first hopper and about 30 minutes in the second and third hoppers. It was found that the material in the first two hoppers slurried easily. The experiment in the third hopper was abandoned because of the excessive rate of introduction of water. The slurried material was easily withdrawn by gravity flow through the water line to a storage tank. No additional agitation was necessary. When the slurry was drained from the hoppers, it was observed that only minor amounts of pigment remained in the compartments. Mild agitation was found sufficient to retain the solids dispersed in the slurry during the residence of the slurry in the tank.

EXAMPLE II

Example I is repeated substituting for the siliceous pigment of Example I a pigment of the following approximate composition and properties:

| | Percent by weight |
|---|---|
| $SiO_2$ | 64.6 |
| Total Na (reported as $Na_2O$) | 7.9 |
| CaO | 0.1 |
| $Al_2O_3$ | 12.1 |
| $Fe_2O_3$ | 0.2 |
| $Na_2SO_4$ | 5.5 |
| Free water | 6.0 |
| Bound water | 7.6 |

Surface area, 90 sq. meters per gram.
Average ultimate particle size, 0.024 micron.

Approximately 7 tons of the pigment are charged to each hopper. About 5760 gallons of water are added to each hopper at 75, 150 and 300 gallons per minute, respectively, to produce slurries of about two pounds per gallon (anhydrous basis). The pigment is observed to disperse readily in the first hopper. Substantial portions of the pigment in the second and third hoppers float on the rising water surface. Mechanical agitation of the floating material produces sticky lumps of undispersed pigment.

It should be understood that the process of this invention is generally applicable whenever it is desired to remove pigments of the nature hereindescribed in slurry form from a confined volume. Thus, the pigment may be charged in dry form, for example, to an essentially water tight storage container or vessel. The sides of the vessel preferably slope to a trough or point at the bottom. Water and air, or other gas, are then introduced at the bottom of the vessel in the same general fashion as described in the examples. When it is desired to provide a low viscosity slurry of siliceous pigment containing CaO or similar metal oxide, $CO_2$ may be introduced in place of all or some of the agitating air. The vessel may be a large storage tank or it may be a relatively small shipping container such as a drum or barrel.

Of course, agitation may be provided by means other than by bubbling gas. Thus, after the water is introduced, the water-pigment mixture can be agitated mechanically, e.g., with rake and gate or equivalent apparatus. Alternatively, the slurry can be agitated by circulating a stream of slurry within the vessel, e.g., with a circulating pump. A stream of slurry is sometimes recycled out and back to the vessel to agitate the pool of slurry therein.

When air or other gases are used to agitate the slurry, it is preferable to direct air against the bottom of the vessel to avoid settling of particles at the bottom of the vessel. It is sometimes advantageous to introduce air at a plurality of locations in the vessel.

It is usually desirable to introduce liquid at the maximum rate at which it will permeate or "wet" the pigment mass in situ. Too fast a flow rate results in a portion of the pigment floating on top of the water thereby segregating masses of pigment in more or less dry or pasty state within the slurry pool. The flow rate should preferably be below the rate where appreciable amounts of pigment, e.g., more than about 1-2 percent of the pigment floats on the water.

As water enters the vessel in which the pigment is contained it tends to flow horizontally to the walls of the vessel. Once water has permeated a portion of the mass of pigment, additional water can normally flow through that portion at increased rate without disturbing the pigment mass. Thus, the permissible flow rate for the water is a function of the area of contact between essentially dry pigment and the entering water. As the area of contact increases, the maximum permissible flow rate of the entering water also increases. In practice, the actual contact area is impractical to measure because of the tendency of the water to meander through the pigment mass, traversing selected paths through the mass at different rates. Thus, the interface between the water and the pigment attains different elevations at different points across the mass. For this reason, the permissible flow rate of the water entering the pigment, i.e., the maximum rate at which water can be introduced without appreciably displacing in an upward direction the pigment mass, is most conveniently determined for a given pigment in a given vessel empirically.

The permissible or desirable flow rate of the water in the several embodiments of this invention depends to some extent on the geometry of the vessel. Greater flow rates are often tolerable, usually desirable, as the cross-sectional area of the vessel increases. The flow rate is often increased without adverse effect as the water level approaches the top of the vessel. The acceptable flow rate is much more dependent on the character of the pigment being dispersed.

EXAMPLE III

About 11,500 pounds of the pigment of Example I was charged into a hopper with 1100 cubic feet capacity. The compartment was "teardrop" shaped such that all four sides of the hopper sloped to the center of the bottom as depicted in the drawings in contrast to the hoppers of Example I in which only two sides sloped to the bottom. As a result, the cross-sectional area of the "teardrop" hopper was significantly less than that of the hoppers of Example I along the lower portion of the hoppers. It was found that the permissible initial flow rate of water into this hopper was only slightly in excess of 100 gallons per minute. Flow rates about 135 gallons per minute tended to lift the pigment without wetting it. Sufficient water was added to form a 2-pound per gallon slurry. Air agitation produced a stable slurry. The slurry was readily drained through a 3-inch water line communicating with the hopper.

Usually, for most pigments contained in standard railroad car hoppers, water introduction flow rates in excess of 500 gallons per minute are inoperable. Flow rates between about 100 and 350 gallons per minute constitute the normal practical operating range. Lower flow rates are operable and within contemplation.

Water temperature influences slurry viscosity, warmer water tending to produce more viscous slurries. This influence is usually of insufficient magnitude to markedly affect the operability of this invention. Normal process water is usually employable. Good results have been obtained with water temperatures ranging from about 50° to about 100° F. All temperatures at which the water is liquid are within contemplation.

Other materials often charged to a process stream containing the siliceous pigments of this invention include without limitation anatase and rutile $TiO_2$ pigment materials and various clay fillers. It is typically necessary to provide high solids content in slurries of those materials to produce stable slurries. Two pound per gallon slurries of paper grade clay or $TiO_2$, for example, usually settle very rapidly upon standing to form a cake of material on the bottom of their containers. This caked material is usually difficult to redisperse. The techniques of this invention are often ineffective to disperse these other materials into stable slurries, i.e., slurries of high solids content, e.g., about 4 pounds per gallon or more. It has been found that stable slurries of admixtures of those materials with siliceous pigments are conveniently prepared by the practice of this invention. Thus by providing as little as about 10 percent, preferably above 25 percent by weight siliceous pigment in the admixture, the preparation of slurries predominating in other powdery materials such as $TiO_2$ or clay, with solids content of about 1 to about 4 or more pounds per gallon, is now possible. Of course, similar admixtures predominating in siliceous pigment materials are operable and within contemplation.

I claim:

1. A method of dispersing finely-divided, dry, powdery siliceous pigment in water to form a flowable slurry which comprises providing a confined mass of said pigment, introducing sufficient water to produce a slurry of predetermined solids content essentially at the bottom of said mass at a sufficiently low rate that the water rises upwardly throughout the mass without appreciably displacing the mass in an upward direction to wet said mass of pigment in situ and agitating the mixture to disperse the pigment in the water thereby forming a slurry.

2. A method of dispersing finely-divided powdery material in aqueous medium to form a stable flowable slurry which comprises providing in said powdery material at least 10 percent by weight siliceous pigment, confining a mass of said pigment in a vessel, introducing essentially at the bottom of said mass sufficient aqueous medium to produce a slurry of predetermined solids content at sufficiently low rate that said aqueous medium thoroughly wets the pigment in situ as it rises upwardly throughout the pigment mass without appreciably displacing the mass upwardly and agitating the mixture to disperse the powdery material in said aqueous medium thereby forming a slurry.

3. The method of claim 2 wherein the mixture is agitated by introducing gas at the lower portion of said mixture.

4. The method of claim 3 wherein said gas is air.

5. The method of claim 3 wherein the gas comprises $CO_2$.

6. The method of claim 2 wherein the dry powdery material includes $TiO_2$ pigment material.

7. The method of claim 2 wherein the dry powdery material includes clay material.

8. A method of dispering in water a confined mass of pigment including precipitated amorphous siliceous pigment with BET surface area between 20 and 100 square meters per gram and average ultimate particle diameter of 0.005 to 1 micron to form a stable flowable slurry which comprises feeding water to the bottom of said pigment mass to produce a slurry containing between 1 and 4 pounds of solids per gallon at a rate at which essentially the entire mass is thoroughly wetted in situ without appreciable displacement in an upward direction and agitating the mixture of water and pigment to disperse essentially all of the pigment in the water.

9. In the method of preparing an aqueous slurry of dry powdery materials by mixing a mass of pigment material with water and agitating the mixture the improvement which comprises including in the mass, siliceous pigment material, confining the mass, introducing water essentially at the bottom of the mass at sufficiently low rate that substantially the entire mass is permeated in situ with water without appreciable displacement in an upward direction and thereafter agitating the water-permeated mass to produce a slurry.

10. In the method of preparing a slurry of dry powdery material including siliceous pigment, the improvement which comprises confining a mass of said powdery material in a vessel, introducing sufficient water to provide a slurry of predetermined solids content essentially at the bottom of the vessel at below 500 gallons per minute, and thereafter introducing air at the lower portion of the vessel to agitate the pigment and water thereby forming a slurry.

11. A method of unloading finely-divided, dry, powdery siliceous pigment from a vessel which comprises introducing to the bottom of the hopper sufficient water to produce in admixture with the pigment in the car a slurry of predetermined solids content at a rate at which the water wets the pigment in situ without appreciable displacement of the pigment from the mass in an upward direction, introducing air to the lower portion of the wetted pigment to agitate the mixture, agitating the mixture to disperse the pigment in the water thereby forming a stable slurry and draining the slurry from the vessel.

References Cited

UNITED STATES PATENTS 2,827,185   3/1958   Feigin _____ 214—83.28

JAMES E. POER, *Primary Examiner.*

TOBIAS E. LEVOW, HELEN M. McCARTHY,
*Examiners.*